United States Patent [19]

Beasely

[11] Patent Number: 5,023,659
[45] Date of Patent: Jun. 11, 1991

[54] COMBINATION REGISTRATION PIN

[76] Inventor: Thomas T. Beasely, 2372 Tyrolean Way, Sacramento, Calif. 95609

[21] Appl. No.: 535,654

[22] Filed: Jun. 11, 1990

[51] Int. Cl.⁵ .............................................. G03B 27/04
[52] U.S. Cl. ........................................ 355/85; 355/78; 355/79
[58] Field of Search ............... 355/78, 79, 85, 86, 355/87, 88, 114

[56] References Cited

U.S. PATENT DOCUMENTS

| | | | |
|---|---|---|---|
| 3,436,149 | 4/1969 | Wicker | 355/85 |
| 4,636,067 | 1/1987 | Richards | 355/79 |
| 4,652,118 | 3/1987 | d'Heureuse et al. | 355/79 |

Primary Examiner—Monroe H. Hayes
Attorney, Agent, or Firm—Wall and Roehrig

[57] ABSTRACT

A compound register pin is provided for aligning lithographic plates and mask sheets which has a rectilinear base portion adapted to fit into the slot of the lithographic plate and a further outer cylindrical portion adapted to accurately fit within the hole of a mask sheet so as to accurately align the mask sheet over the lithographic plate for transfer of the mask sheet images to the lithographic plate in precise registration.

13 Claims, 1 Drawing Sheet

COMBINATION REGISTRATION PIN

BACKGROUND OF THE INVENTION

This invention relates to lithography and in particular to a registration pin for use in a pin registration system for recording a developable latent image upon a sensitized lithographic plate.

In one form of lithography a photographic negative image of all subject matter to be reproduced is prepared on a light table or other suitable device and then the image must be transferred precisely to the lithographic plate which is to be developed and used in the printing press.

Typically a mask sheet is prepared on a light table and then the mask sheet is aligned with a lithographic plate in a platemaker for transfer of the latent image thereto by exposure to a light of suitable intensity and duration. As the art has developed, some printing presses available for use in this process have developed their own particular alignment pins requiring corresponding and mating holes to be available in the separately prepared mask sheets such as those prepared utilizing the layout board of the type shown in my patent U.S. Pat. No. 4,284,349 issued Aug. 18, 1981 to Beasley et al. This has necessitated either using a specific layout board and alignment pin configuration which locks one into using a particular manufacturers complete system or else stocking a wide variety of materials for each type of press and alignment system.

To aid in a proper understanding of the background and significance of the present invention, Applicant hereby incorporates by reference U.S. Pat. No. 4,284,349 to Beasley et al. issued Aug. 18, 1981.

SUMMARY OF THE INVENTION

It is therefore an object of the present invention to provide a compound registration pin that will accept and accurately align sheet material having more than one type of alignment aperture. It is another object of the present invention to provide an improved register pin that may be used with a variety of mask sheets and printing presses. It is a still further object of the present invention to provide a registration pin that can be made in different sizes and shapes to accommodate a variety of registration systems.

Registration systems have been developed to insure accurate positioning of the image through each step. For registration purpose the lithographic plate, mask sheet and printing press have matching sets of holes and register pins. The image on the mask sheet is registered to the lithographic plate by utilizing punched holes and a set of register pins. The lithographic plate is then registered to the printing press by mounting the holes in the plate over a set of register pins in the printing press.

These register systems vary widely from manufacturer to manufacturer. Some systems work with only round holes. Others work with round and slotted holes. The slots can run vertically or horizontally. Some systems work with 2 pins and others use more. The diameter of the pins vary and spacing between pins vary. Each register system comes with its own punch to punch the proper hole pattern.

The purpose of this invention is to provide a compound register pin which will adapt different register systems together to provide more versatility in the workplace.

BRIEF DESCRIPTION OF THE DRAWINGS

For a better understanding of these and other objects of the present invention reference is had to the following detailed description of the invention which is to be read in conjunction with the accompanying drawings wherein.

DESCRIPTION OF THE INVENTION

Figure 1:
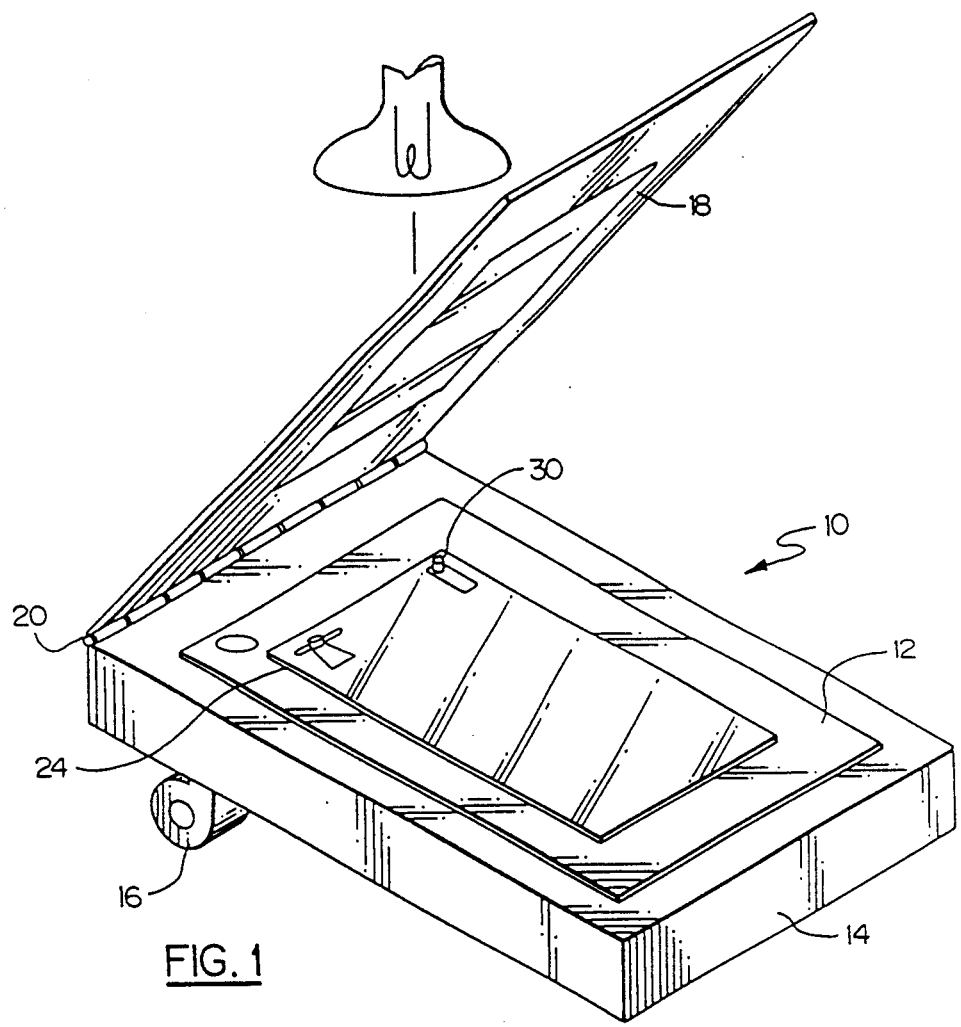
FIG. 1 is a perspective view of a platemaker for exposing lithographic plates.

Referring now to FIG. 1 after a mask sheet 22 is prepared in accordance with the above-referenced patent, the image on the mask sheet must be transferred to a lithographic plate 24 and it is normally done in a device called a platemaker which basically includes a vacuum box 14 and an exposure light 15. The vacuum box or frame 14 consists of a rubber blanket work surface 12, a transparent cover 18 of glass which is hinged at one end 20, and a vacuum pump 16 which draws a vacuum between the rubber blanket work surface 12 and the glass cover 18. The vacuum holds the lithographic plate and mask sheet in intimate contact with each other. After the vacuum is drawn the plate is exposed with the exposure light 15.

Figure 3:
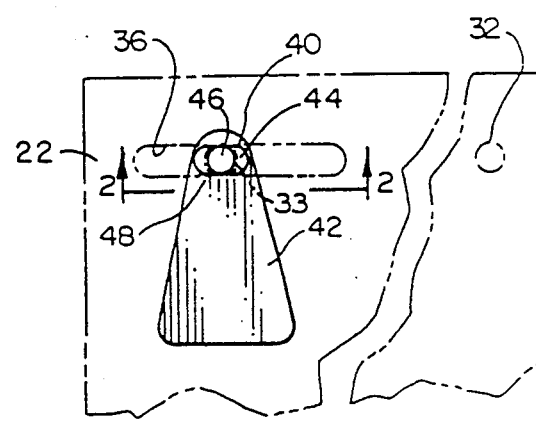
FIG. 3 is a top plan view of the pin of FIG. 2.

To ensure proper alignment of the mask and litho plate in the platemaker, individual register pins are provided one usually being a circular pin 30 inserted through hole 32 and the other being a compound rectilinear pin 40 positioned in slot 36. (FIG. 3).

Figure 2:
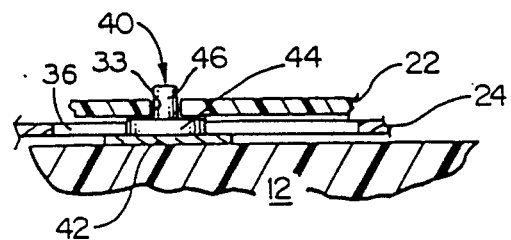
FIG. 2 is an enlarged side elevational view of a locater pin according to the present invention with relative dimensions exaggerated for clarity of explanation.

As may be seen in FIG. 2, register pin 40 according to the present invention comprises a compound pin having different type shapes and dimensions at the base and at the outer end portions thereof. The relative dimensions are exaggerated for clarity of presentation. Specifically the register pin 40 according to the present invention comprises a planar base portion 42 usually made of stainless steel and having sufficient flat area to properly support and maintain the register pin in an upright position when the base is placed on a flat surface. The register pin 40 is fastened to the base member 42 by welding, riveting or other mechanical fastening means and is of sufficient size and strength to maintain the pin in a perpendicular relationship to the base.

The register pin 40 has a lower rectilinear portion 44 and an upper pin cylindrical portion 46 with the bottom portion having linear sides 48 parallel to each other and spaced apart a distance equal to the diameter of the pin portion 46 extending therefrom. A cylindrical pin in a slot makes a point contact at each end of the diameter of the pin with the edge of the slot in the plate 24. Slot 36 since it is only 7 thousandths of an inch or so thick, could easily be deformed by a circular pin and cause misalignment of the mask 22 on the plate. Accordingly, a wider surface area support must be provided for plates that have a slot to ensure accurate alignment. The parallel sided portion of the base usually has a curved surface at each end of a larger diameter than the diameter of the pin extending upwardly therefrom. This curved end facilitates the application of the plate or mask over the base portion as the case may be, as opposed to a sharply rectangular configuration where the corners might afford opportunity for tearing or damaging of the apertures in the plates 24 or masks 22.

The lower portion 44 normally has a thickness or depth of 10 to 20 thousandths of an inch so as to accommodate a lithographic plate, which nominally has a thickness of some 4 to 10 thousandths depending on the application. The extra depth of portion 44 prevents accidental dislodging of the plate from the pin and consequent misalignment. The mask sheets 22 made in accordance with my above-referenced patent generally have two circular holes in the upper margin. To align a mask 22 with a plate 24 a circular pin 30 is inserted through a hole in plate 24 and a corresponding hole 32 in the mask 22. The pin 40 as shown in FIGS. 2 and 3 is then inserted through the slot in the plate 24 to locate and properly seat it about the rectilinear portion 44. The mask sheet 22 is then positioned on the pin portion 46 of the register pin 40 at hole 33 which with the circular pin 30 will cause the mask sheet 22 to be properly aligned with the lithographic plate 24 for accurate transfer of the image and for the ultimate accurate printing of the desired information. As shown in FIGS. 1-3, the upper pin 46 diameter is the same as the diameter of pin 30. The height of the pin portion 46 is adjusted to accommodate one or more mask sheets depending upon the application thereof. In some situations, the "mask" may be made in several different layers and all may have to be superimposed for transfer of the desired image to the lithographic plate.

The pin 40 as shown in FIGS. 2 and 3 is shown with the upper portion having a diameter equal to the perpendicular distance between the linear sides 48 of the lower pin portion 44. Some applications may require that the perpendicular distance between the linear sides be greater than the diameter of the pin portion 46. This also may require that the pin 30 used to align the hole of the plate and the mask sheet material may have to have multiple diameters equal to the effective dimensions of the lower pin portion 44 when it is larger than the diameter of pin portion 46.

For some applications the diameter of pin portion 46 may be greater than the perpendicular distance between sides 48. In this case, the sides of pin 48 are advantageously ground flat to match the width of base portion 44 so as not to damage the slot 36 when pin 40 is inserted in plate 24. Pin diameters from ⅛" to ⅜" have been found to be satisfactory.

The current register pins on the market have only two shapes—round or oval. Using these pins it is very difficult if not impossible to integrate two different register systems together, i.e., a lithographic plate with slotted holes and a mask sheet using round holes.

Current register systems require their own punch to punch, their particular hole configuration and this hole configuration will not integrate with anything different. The register system as described in the foregoing patent uses round holes and cylindrical pins for alignment of both sides. The pin of the present invention allows exact alignment in the platemaker of various types of commercially available lithographic plates and mask sheets made from a wide variety of layout systems.

There is thus provided a more universal register pin that permits precise and accurate alignment of a variety of mask sheets and lithographic plates to ensure precise transfer of images for subsequent printing.

While this invention is described with reference to the structure disclosed herein, it is not confined to the details set forth and this application is intended to cover any modifications or changes and may come within the scope of the following claims.

What is claimed:

1. A register pin for use in a registration system for aligning a layout mask sheet and a lithographic plate comprising in combination:
    a thin planer base member;
    a first register pin portion mounted on said base member in perpendicular relation thereto and having a pair of opposed, spaced apart, parallel side surfaces;
    a second register pin portion having a circular cross section mounted on said first pin portion;
    said second register pin portion having the axis thereof positioned perpendicular to said base member and in a plane passing through the midpoint between said side surfaces and parallel thereto.

2. A device as described in claim 1, wherein the diameter of the second register pin portion is equal to the perpendicular distance between the parallel side surfaces of said first register pin portion.

3. A device as described in claim 1, wherein said first register pin portion has a cross section approximating a flat-sided ellipse.

4. A device as described in claim 2, wherein the diameter of said pin and the perpendicular distance between said side surfaces range from ⅛ to ⅜ of an inch.

5. A device as described in claim 1, wherein said first register pin portion has a perpendicular width between said side surfaces at least as large as the diameter of said cylindrical second register pin portion.

6. A register pin as described in claim 1, wherein said cylindrical second register pin portion has a diameter greater than said perpendicular width and the sides of said cylindrical portion are flattened to be in the same planes as said parallel side surfaces.

7. A device as described in claim 5, wherein said perpendicular width is greater than said diameter.

8. An article of manufacture comprising;
    a flat base member;
    a compound register pin member fixed to said base member with its axis perpendicular thereto;
    said pin member having a first rectilinear portion adjacent said base member and a second cylindrical portion extending outwardly from said first portion and in axial alignment therewith whereby sheet material having different shape hole configurations therein can be positioned about said pin member to align said sheet material.

9. An article of manufacture as described in claim 8, wherein said rectilinear pin portion has a pair of parallel flat sides spaced apart a width equal to the diameter of said cylindrical pin portion.

10. An article of manufacture as described in claim 9, wherein said cylindrical second register pin portion has a diameter greater than said perpendicular width and the sides of said cylindrical portion are flattened to be in the same planes as said parallel side surfaces.

11. A register pin system for aligning a layout mask and a lithographic plate for use in carrying out a lithographic process comprising:
    a first register pin member having a thin planar base member and a cylindrical pin mounted on said base member in perpendicular relation thereto;
    a second register pin member having a thin planar base member and a stepped pin mounted on said base member in perpendicular relation thereto;

said stepped pin of said second register pin member, having a rectilinear portion adjacent said base member and a cylindrical portion extending outwardly therefrom;

whereby a lithographic plate having an alignment hole and an alignment slot may be aligned with a layout mask having two alignment holes by positioning said first register pin in one set of holes and said second register pin in the plate slot and then the other mask hole.

12. A register pin system as described in claim 11, wherein said second register pin rectilinear portion has a pair of spaced apart parallel side surfaces and the perpendicular distance between said surfaces is equal to the diameter of said cylindrical portion extending outwardly therefrom.

13. A register pin system as described in claim 11, wherein the diameter of the cylindrical portion of the second register pin is equal to the diameter of said first register pin.

* * * * *